(No Model.)

J. DALEY.
TWO WHEELED VEHICLE.

No. 425,566. Patented Apr. 15, 1890.

Witnesses
R. A. Balderson
J. A. Fairfax

Inventor
Joseph Daley

By his Attorneys
Higdon & Higdon

UNITED STATES PATENT OFFICE.

JOSEPH DALEY, OF EMPORIA, KANSAS.

TWO-WHEELED VEHICLE.

SPECIFICATION forming part of Letters Patent No. 425,566, dated April 15, 1890.

Application filed February 8, 1890. Serial No. 339,701. (No model.)

*To all whom it may concern:*

Be it known that I, JOSEPH DALEY, of Emporia, Lyon county, Kansas, have invented certain new and useful Improvements in Trussed Axle and Spring Attachments for Speeding-Carts, of which the following is a full, clear, and exact description, reference being had to the accompanying drawings, forming a part hereof.

My invention relates to improvements in trussed axles and spring attachments for speeding-carts, &c.; and it consists in the novel construction and arrangement hereinafter set forth and described.

The objects of my invention are, first, to provide an axle light and durable; second, to provide an axle with trusses, to which may be secured the spring, and, third, to attain these ends with simplicity and economy of construction, which I do by employing the device illustrated in the accompanying drawings, in which—

Figure 1:
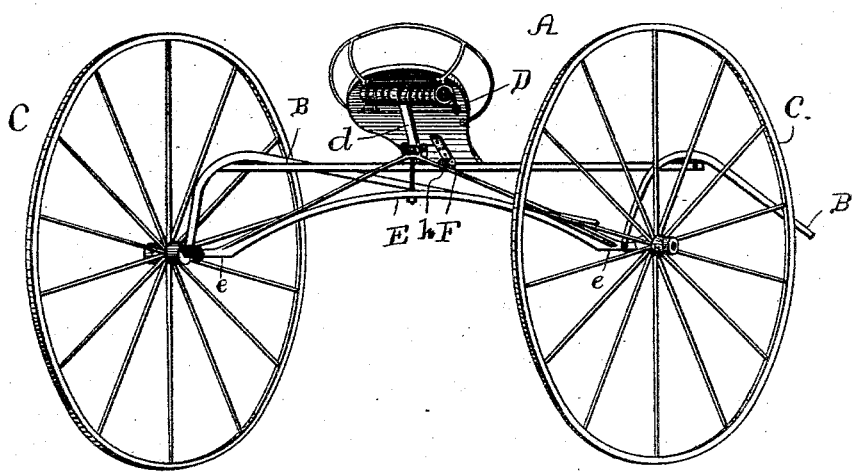
Figure 2:
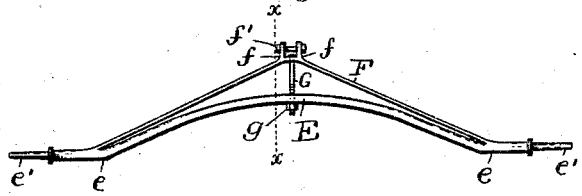
Figure 3:

Figure 1 shows a perspective view of a speeding-cart mounted on my improved axle. Fig. 2 is a front elevation of said axle. Fig. 3 is a sectional view taken on line $x$ $x$ of Fig. 2.

Referring to the drawings by letter, A represents my invention.

B are suitable shafts secured to the axle E, which is mounted on wheels C.

D is a seat for said speeding-cart, mounted on the coil-spring $d$ and secured in the attachments $f$, as shown in Fig. 1.

E represents my improved axle having the spindle $e'$ constructed in the ordinary manner, which may be provided with suitable nuts for holding the wheels in position, said axle E being made segmental in shape, so that when the horse is hitched in the shafts and is traveling very rapidly his limbs will not come in contact with said axle.

From the points $e$ $e$ of the axle a truss F is provided which extends upward at an obtuse angle. This truss F meets at a central point and is provided with a vertical shackle $f$, through which is secured a bolt $f'$, which holds the coil-spring $d$, which in turn secures the seat in position. This truss F, shackles $f$, and axle E are wrought in one piece, thereby dispensing with rivets and bolts.

G is a king-bolt which passes from the center of the truss F downward through the axle E, where it is provided with a nut $g$, by which said bolt G may be kept tight, thereby making the tension between the truss and axle rigid.

By having this axle constructed in the manner illustrated I provide an axle which is very durable, the segmental shape of said axle causing it to be raised high enough to keep the limbs of the animal secured between the shafts from coming in contact therewith.

The truss F gives greater strength to the axle, and the weight of the seat, instead of coming directly on the center of the axle, is equalized by said trusses and king-bolt G and distributed over the entire axle. The front end of the seat is hinged to the cross-bar by hinge $h$ so as to give the spring an easy movement.

Having thus fully described my invention, what I claim as new, and desire to secure by Letters Patent, is—

1. A trussed axle and spring attachment, composed of the main segmental axle E, wrought in combination with trusses F, which are provided with shackles $f$, to which the coiled spring $d$ is secured and held in position by means of bolt $f'$, for the purposes substantially as specified.

2. In a sulky, the combination, with the trussed axle, of the trusses F, provided with shackles $ff$, of a seat hinged at $h$ and supported by a coiled spring $d$, said coiled spring having an arm provided with an eye on its end extending down to and fastened in the shackles $ff$ by means of the bolt $f'$, substantially as hereinbefore described.

In testimony whereof I affix my signature in presence of two witnesses.

JOSEPH DALEY.

Witnesses:
GEORGE K. MARTIN,
WM. R. CARLOW.